Oct. 7, 1969   E. LATTA ET AL   3,471,729
PLURAL MOTOR ASSEMBLY
Filed Feb. 10, 1966
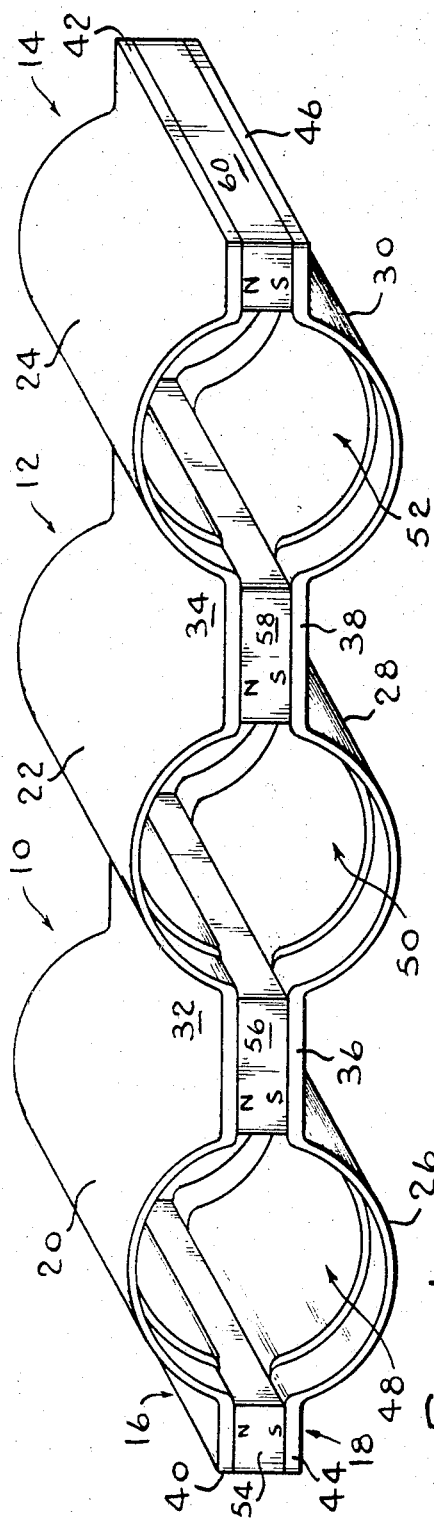
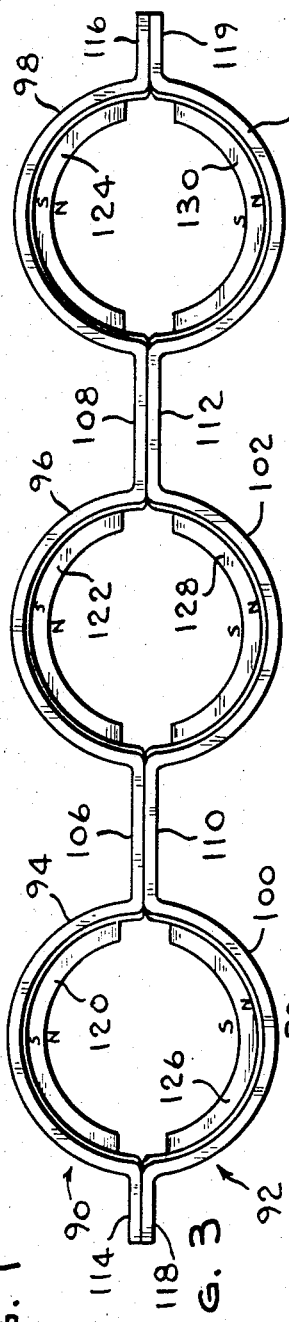
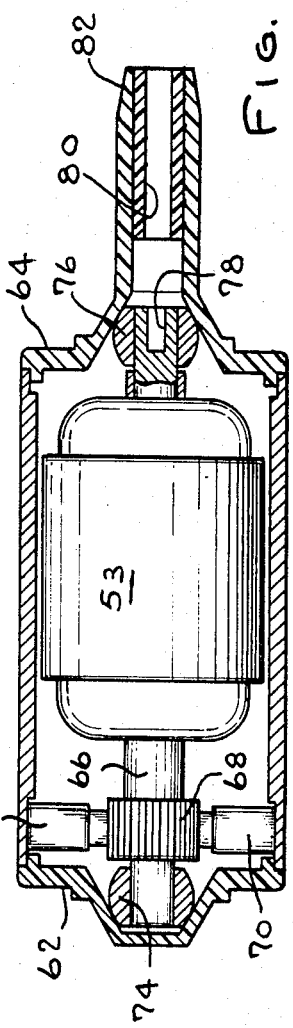
INVENTORS
EDWARD LATTA
EDMUND J. GODIN
BY Bayard H. Michael
ATTORNEY

United States Patent Office 3,471,729
Patented Oct. 7, 1969

3,471,729
PLURAL MOTOR ASSEMBLY
Edward Latta, Owosso, and Edmund J. Godin, Detroit, Mich., assignors, by mesne assignments, to Controls Company of America, Melrose Park, Ill., a Delaware corporation, organized in 1966
Filed Feb. 10, 1966, Ser. No. 526,558
Int. Cl. H02k 1/12, 5/04
U.S. Cl. 310—112                                5 Claims

ABSTRACT OF THE DISCLOSURE

Two complementary formed motor shell sections are each provided with one or more portions which are formed as sections of a cylinder. The shell sections are joined with cylindrical sections in alignment to thereby define a cylindrical motor shell and armature receiving opening.

---

This invention relates to electric motors and, more particularly, to an improved construction whereby a number of electric motors are connected in an integral assembly.

In applications requiring a number of different drive movements it has generally been the practice to use a single motor and to achieve the desired drive movements through the use of selector controls such as solenoids and the like. An example of such an application is in automotive power seats wherein the user is given control over seat movement in a number of different directions, namely fore and aft as well as up and down. Generally this movement has been achieved with the combination of a single motor and suitable clutch and drive trains as mentioned above.

This invention is concerned with this problem in power seat drives but has application beyond that specific environment and contemplates generally a simplification in drives of this type by using a number of motors to achieve the driven movements thereby eliminating the need for complex arrangements of clutches, drive trains and/or selector control mechanisms. This simplification is achieved by optimum use of the structural and magnetic field elements of the motor, or motors.

Accordingly, an object of this invention is to provide an improved and simplified drive arrangement capable of providing a number of different drive motions.

A more specific object of this invention is to provide a simplified and effective integral multiple motor assembly.

This invention will be discussed in connection with a permanent magnet motor construction; however, at the outset it should be pointed out that this invention has application generally to other types of motor constructions. A conventional type of permanent magnet motor includes a motor shell which provides the support for the permanent magnet field generating members and also cooperates in forming the outer motor housing. In accordance with this invention the shells of a number of motors are integrated into a common shell arrangement to provide in a single assembly the outer shells and support frame for a number of motors.

Other objects and advantages will be pointed out in, or be apparent from, the specification and claims, as will obvious modifications of the embodiments shown in the drawings, in which:

FIG. 1 is a perspective view of a multiple motor frame and shell constructed in accordance with this invention;

FIG. 2 is an axial section through one of the motor sections of a motor assembly incorporating the motor frame and shell of FIG. 1; and FIG. 3 is an end view of an alternative motor frame and shell construction embodying this invention.

With particular reference to the drawings, the multiple motor frame and shell is illustrated as including three individual motor shell sections 10, 12 and 14. These sections are formed by a pair of housing members 16 and 18. Each housing member is stamped from a material sheet, or otherwise suitably formed, in an elongated strip. The elongated strip is then formed to provide arcuate sections 20, 22, 24, 26, 28 and 30 in strips 16 and 18. These arcuate sections are relatively spaced apart along the longitudinal extension of the strips and are connected by integrally-formed webs. More particularly, sections 20, 22 and 24 are connected by webs 32 and 34 with sections 26, 28 and 30 being connected by webs 36 and 38. Formed strips 16 and 18 are completed by end projections 40, 42 and 44, 46, respectively.

Strips 16 and 18 are assembled so that the arcuate sections thereof are arranged in opposed pairs with the inner arcuate faces of each opposed pair in confronting relationship to define generally circular openings 48, 50 and 52 for receipt of a motor armature of any conventional construction, for example that illustrated generally as armature 53 in FIG. 2. For a purpose which will become more evident from the following discussion, webs 32, 34, 36 and 38 are also arranged in opposed relation, as are end projections 40, 42, 44 and 46.

The magnetic field for the motor section is generated through the use of four bar-type permanent magnets 54, 56, 58 and 60, the magnets being of any conventional construction, for example ceramic-type magnets. As can be seen in FIG. 1, bar magnets 56 and 58 are sandwiched between the inner opposed faces of webs 32, 36 and 34, 38, respectively, whereas bar magnets 54 and 60 are sandwiched between the inner opposed faces of end projections 40, 44 and 42, 46, respectively. The bar magnets can be connected to the strip in any suitable manner, for example through the use of a suitable adhesive or, if desired, can be connected with a through bolt. The bar magnets are each magnetized through their thickness dimension (their extension between the webs or end projections of the strips) so that the magnetic axes of the bar magnets are generally parallel with respect to each other. The magnetic orientation of the magnets with respect to strips 16 and 18 is the same. More particularly, the faces of the bar magnets engaging strip 16 are of one magnetic polarity, for example a north pole, and the oposite faces engaging strip 18 and are of an opposite magnetic polarity, a south pole (the magnetic orientation has been noted in FIG. 1 of the drawing). With this arrangement strips 16 and 18 become part of the magnetic circuit and, in effect, arcuate sections 20, 22, 24, 26, 28 and 30 of strips 16 and 18 become pole faces with sections 20, 22 and 24 exhibiting the characteristics of a north magnetic pole whereas sections 26, 28 and 30 exhibit the characteristics of a south magnetic pole.

The flux paths for bar magnets 56 and 58 are such that the magnetic flux separates substantially uniformly from each magnet 56 and 58 into webs 32 and 34 on both sides of a centerline through the webs. The flux paths for each magnet continue through sections 20, 22 and 24 to the central area of each section, then pass generally on opposite sides of the vertical centerline of openings 48, 50 and 52 through the motor armatures (not shown) and return through sections 26, 28 and 30 to webs 36 and 38 and the opposite faces of magnets 56 and 58. The flux paths for magnets 54 and 60 pass through end projections 40 and 42 into sections 20 and 24 to a point in the central area of those sections and then through the motor armatures and return to magnets 54 and 60 through sections 26 and 30 and end projections 44 and 46. In other words, the strips, and the motor housing shells provided thereby, cooperate in the magnetic circuits of the motor sections with adjacent magnets providing the flux for the motor section disposed therebetween. Namely, magnets 54 and 56 provide the flux for motor section 10, magnets 56 and 58 provide the flux for motor section 12 and magnets 58 and 60 provide the flux for motor section 14 with the flux from adjacent magnets separating into the motor armature at approximately the vertical centerline of the shell.

With reference to FIG. 2, each of the motor sections formed by strips 16 and 18 and magnets 54-60 can be completed by assembling an armature 53 within each of the motor sections and closing the axial ends of the motor sections with end caps 62 and 64 in a conventional manner. Armature shaft 66 carries a commutator 68 which cooperates with brushes 70 and 72 supported from the motor housing shell or end cap 62 if desired and the shaft is journalled in bearings 74 and 76 supported in end caps 62 and 64. The commutator, brush and shaft and shaft support are conventional and well known and therefore have been only illustrated generally schematically. Shaft 66 is provided with an axially extending slot 78 for establishing a driving connection between the shaft and, for example, a fllexible shaft (not shown) which extends through tube 80 supported in end cap projection 82. The connection of magnets 54-60 to the strips cooperates to hold the strips together and this connection of the strips can be further strengthened by other conventional means (not shown), for example, connection of each strip to the end caps.

Strips 16 and 18 provide a support for the field generating magnets, cooperate in completing the magnetic circuit for the motors, in effect become the pole pieces for the magnetic field, provide the outer shell housing for the individual motor section and, in addition, provide an effective connection between the motor sections.

A further advantage of the specific arrangement disclosed in FIG. 1 is that removal of the magnets from the point within the arcuate sections 20-30 permits a relatively lower overall motor profile and provides a more compact assembly. However, FIG. 3 illustrates that this invention is not limited to the specific arrangement of FIG. 1 but can be used in the more conventional motor construction wherein the field generating permanent magnets are supported on the inner arcuate faces of the motor frame and shell. In the construction of FIG. 1 the arcuate sections 20-30 were each individually an arcuate segment less than half of a circle, with the radial extension of magnets 54-60 completing the necessary radial extension to result in a generally circular armature receiving opening. In the construction of FIG. 3 strips 90 and 92 are provided with sections 94, 96, 98, 100, 102 and 104 which each comprise a generally semicircular portion so that when joined as illustrated they form a circular opening. The sections are connected by webs 106, 108, 110 and 112 which are integrally formed with the arcuate sections so that again only two shell members need be fabricated to provide the motor frame and shell for three motor sections. Each strip terminates in oppositely directed end portions 114, 116 and 118, 119 and the strips are connected in a conventional manner, for example by spot welding at the confronting end portions and webs. Permanent magnet sections 120, 122, 124, 126, 128 and 130 are suitably supported on the inner faces of the arcuate sections 94-104 and are magnetized through their thickness or radial dimensions. As illustrated, one of the arcuate magnet sections in each motor section is magnetized such that it will present a north magnetic pole to the armature (not shown) whereas the other magnetic section presents a south magnetic pole, as illustrated in the drawings. Again the magnets supported on strip 90 are similarly magnetized as are those on strip 92 so that again the strips cooperate in providing a portion of the magnetic circuit. With regard to the motor section at the extreme left of FIG. 3, the magnetic flux path for magnet 120 will divide equally on opposite sides of the vertical centerline into arcuate section 94 and will pass through arcuate section 100 and into magnet 126 and through the motor armature back to magnet section 120. Here again the construction utilizes the improved motor frame shell construction to provide in a unitary assembly the outer motor housing shells for a multiple motor assembly while providing the frame connection between the motors to hold them in desired assembled relationship and also provide a portion of the magnetic circuit to maintain effective operation.

Either of the disclosed arrangements provides desirable operation and simplification of the motor installation, however, that of FIG. 1 is preferred from the standpoint that it provides a more compact unit and a more efficient utilization of magnetic material.

Although this invention has been illustrated and described in connection with particular embodiments thereof, it will be apparent to those skilled in the art that various changes and modifications may be made therein without departing from the spirit of the invention or from the scope of the appended claims.

We claim:
1. In a multiple motor assembly, the combination comprising, a plurality of armatures:
   first and second elongated sheet metal members of uniform thickness and planar cross-sectional configuration, each including, as a one-piece structure, a plurality of relatively spaced, generally arcuate portions and a connecting portion extending between adjacent arcuate portions,
   said first and second members connected and arranged with the arcuate portions of said first member in alignment with the arcuate portions of said second member and confronting arcuate portions defining a plurality of armature receiving openings between said first and second members,
   end plate means engageable with said first and second members at said openings,
   means for mounting one of said motor armatures in each of said openings,
   magnetic field generating means,
   and means connecting said magnetic field generating means to said first and second members at each of said openings to generate a magnetic field at each of said openings.
2. In a multiple motor assembly, the combination comprising:
   magnetic means defining first and second opposed motor housing members each including, as a one piece structure, a plurality of alternately arranged, interconnected arcuate portions and generally planar portions,
   said first and second opposed housing members arranged with the arcuate and planar portions of said first housing member in alignment with the arcuate and planar portions of said second housing member whereby confronting arcuate portions define a plurality of armature receiving openings therebetween,
   magnetic field producing means disposed between confronting interconnecting planar portions of said housing members and polarized transversely of the plane of said interconnecting planar portions whereby said first and second housing members are magnetized with respectively different polarities to provide field pole faces throughout said confronting arcuate portions.
3. A multiple motor assembly as set forth in claim 2 wherein the field producing means are permanent magnets.
4. A multiple motor assembly as set forth in claim 2 wherein said field producing means interconnect said confronting planar portions to provide structural support for the opposed housing members.
5. A multiple motor assembly as set forth in claim 2 wherein the magnetic field flux is developed in said planar portions is split to follow divergent paths to each adjacent arcuate portion.

References Cited

UNITED STATES PATENTS

| | | | |
|---|---|---|---|
| Re. 12,543 | 10/1906 | Collins | 310—112 |
| 3,258,622 | 6/1966 | Gillespie | 310—154 |
| 2,463,349 | 3/1949 | Baner | 310—112 |
| 3,215,875 | 11/1965 | Latta | 310—154 |

FOREIGN PATENTS 884,487   12/1961   Great Britain.

MILTON O. HIRSHFIELD, Primary Examiner

D. F. DUGGAN, Assistant Examiner

U.S. Cl. X.R.

310—114, 154